Aug. 18, 1931.  H. S. BROADWELL ET AL  1,819,724
FISHING REEL
Filed Feb. 7, 1929
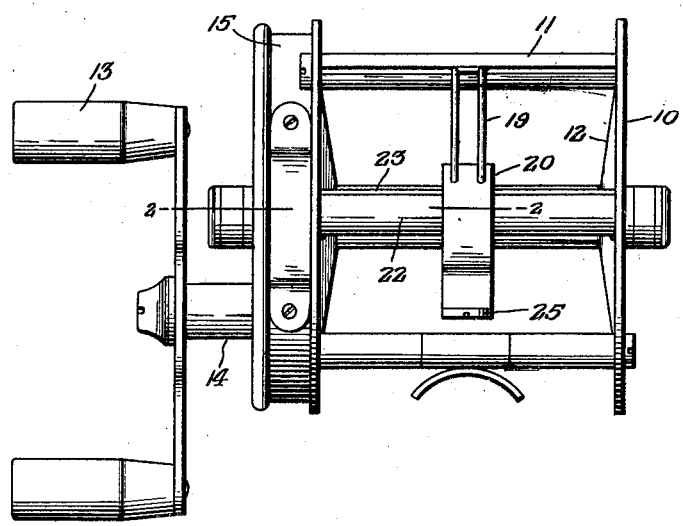
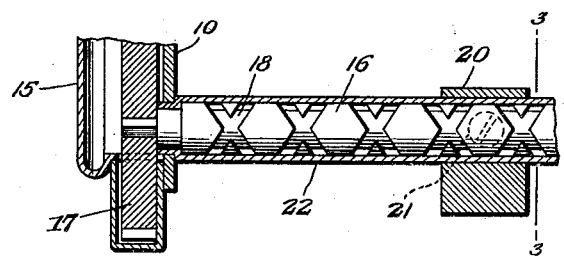
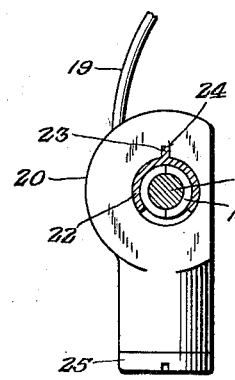
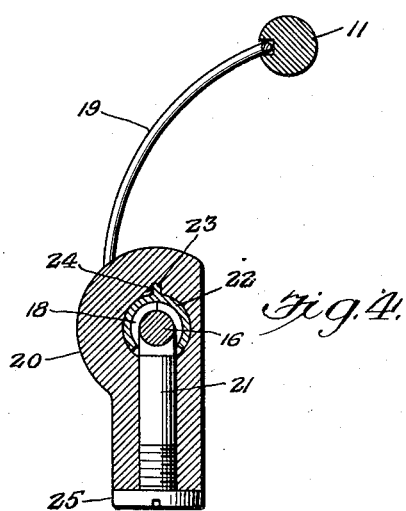
Inventors
H. S. Broadwell and
Samuel T. Thorpe
By Church & Church
their Attorneys Patented Aug. 18, 1931

1,819,724

UNITED STATES PATENT OFFICE

HALVOR S. BROADWELL AND SAMUEL T. THORPE, OF BRISTOL, CONNECTICUT, ASSIGNORS TO THE HORTON MANUFACTURING COMPANY, OF BRISTOL, CONNECTICUT, A CORPORATION OF CONNECTICUT

FISHING REEL

Application filed February 7, 1929. Serial No. 338,170.

This invention relates to improvements in fishing reels and especially to devices now commonly found on such reels for insuring the line being laid level on the reel spool while being wound thereon.

Primarily the invention seeks to simplify devices of this nature. Usually these devices generally embody a line guide carriage slidably mounted on a guide bar and held against rocking on said bar by what is sometimes called a steadying bar. This so-called steadying bar is eliminated in the present instance by mounting the carriage on a guide bar of irregular cross-section whereby it is impossible for said carriage to rock or turn with respect to the bar. It is also preferred that said guide bar be made tubular and placed around the traversing shaft, acting as a casing or housing therefor.

With these and other objects in view the invention consists in certain novel details of construction and combinations and arrangements of parts, all as will hereinafter be more fully described and the novel features thereof particularly pointed out in the appended claims.

In the accompanying drawings,

Figure 1 is an elevational view of a reel embodying the present improvements;

Fig. 2 is a sectional view on the line 2—2 of Fig. 1, portions of the reel proper being omitted;

Fig. 3 is a sectional view on the line 3—3 of Fig. 2; and

Fig. 4 is a sectional view through the line guide carriage.

The reel proper may be of any desired construction so far as the present invention is concerned. The usual construction is illustrated, the frame comprising end plates 10 and spacer bars 11 with the spool 12 journaled in suitable bearings in said plates. The spool is actuated by the handle 13 on a shaft 14 through suitable gearing enclosed by a housing 15 mounted on one of said end plates.

The present level winding devices comprises a traversing shaft 16 journaled in the end plates 10 and adapted to be rotated by a gear 17 from the spool actuating gearing before mentioned. This shaft 16 has oppositely disposed spiral grooves 18 therein, said grooves merging into one another at the ends of said shaft, as is customary in these level winding attachments.

The fishing line, (not shown) is adapted to pass through a guide 19 mounted on the line guide carriage 20 and said carriage has a pawl 21 therein engaging in the grooves 18 whereby said carriage will be moved back and forth across the reel as the traversing shaft is rotated.

In accordance with the present invention the device is simplified by the elimination of what has heretofore commonly been termed the steadying bar for said line guide carriage. This is accomplished by having the carriage mounted to reciprocate on a guide bar 22 of irregular cross-section. As illustrated said guide bar 22 is tubular and serves as a housing for the traversing shaft. Preferably, it is substantially cylindrical in cross section but to prevent rocking of the line guide carriage thereon, it is formed with a longitudinally extending rib 23 which engages in a transverse recess 24 in the carriage. This permits the carriage to be reciprocated freely but, at the same time, it is firmly held against any rocking movement even though no steadying bar is utilized.

It might be added that the pawl 21 is held in the carriage by a screw 25, by which the position of said pawl relatively to the traversing shaft may be regulated.

What we claim is:

1. In a fishing reel, a frame, a spool, a traversing shaft, a cylindrical tubular casing around said shaft, a line guide carriage slidable on said casing, said casing constituting the sole support for said carriage, a rib extending along said casing engaging in a recess in said carriage for preventing rocking of the carriage on the casing, and a pawl in said carriage co-acting with said shaft, said pawl being held against movement circumferentially of said shaft.

2. In a fishing reel, a frame, a spool, a traversing shaft, a tubular casing around said shaft, a line guide carriage slidably mounted on the casing, a pawl in said carriage co-acting with said shaft, and means for preventing rocking of the carriage on said casing, said means consisting of a recess formed in one of said last mentioned members and a rib on the other of said members engaging in said recess, said pawl being held against movement circumferentially of said shaft.

HALVOR S. BROADWELL.
SAMUEL T. THORPE.